(12) United States Patent  
Petin et al.

(10) Patent No.: US 6,588,317 B2  
(45) Date of Patent: Jul. 8, 2003

(54) POWER BOOSTER SEALING MECHANISM

(75) Inventors: Bernard Petin, Dayton, OH (US); Patrick T. Maclellan, Dayton, OH (US); Roger Sexton, Dayton, OH (US); Philippe G. Castel, Paris (FR); Michael A. Kasselman, West Chester, OH (US); Mike W. Fanelli, Centerville, OH (US); Michael J. Vermoesen, Pittsfield, MA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/036,598

(22) Filed: Nov. 9, 2001

(65) Prior Publication Data

US 2003/0089226 A1 May 15, 2003

(51) Int. Cl.[7] .................................................. F01B 11/02
(52) U.S. Cl. ....................................................... 92/169.3
(58) Field of Search ........................ 91/376 R; 92/169.2, 92/169.3, 169.4

(56) References Cited

U.S. PATENT DOCUMENTS 5,878,650 A * 3/1999 Osterday et al. ........... 92/169.3

* cited by examiner

*Primary Examiner*—Edward K. Look  
*Assistant Examiner*—Thomas E. Lazo  
(74) *Attorney, Agent, or Firm*—Scott A. McBain

(57) ABSTRACT

A power booster comprises a housing, a tube, and a seal. The housing includes a front housing section, a rear housing section, and a divider. The tube is mechanically fastened proximate the rear housing section and generally stationary relative to the rear housing section, with the seal between the divider and the tube.

20 Claims, 4 Drawing Sheets

POWER BOOSTER SEALING MECHANISM

TECHNICAL FIELD OF THE INVENTION

The invention relates to a power booster sealing mechanism. More particularly, the present invention relates to a power booster with a sealing mechanism for surrounding a component that extends through the power booster and penetrates an internal wall.

BACKGROUND OF THE INVENTION

Power boosters operating on a pressure differential, such as exists between the engine intake manifold of a vehicle and the atmosphere, are well known devices. In the case of a single stage power booster, a shell-like housing typically encloses at least one variable pressure chamber that is separated from a vacuum chamber by a diaphragm and its supporting wall. The diaphragm and supporting wall are axially moveable relative to the housing under variable pressure conditions. In order to achieve an increased boost effect, tandem power boosters have the interior of the housing subdivided by a housing divider wall separating a secondary variable pressure and vacuum chamber combination from the primary chamber pair. In all cases, a power piston is urged to move axially by the diaphragm(s) and actuates an output rod for operating the vehicle brakes through an engaged hydraulic master cylinder.

It has long been known that the weight of a power booster can be reduced by using thin-wall or lightweight material for the housing walls. When this is done, some additional structural support is obviously needed to maintain the structural integrity of the housing. One manner of providing the additional structural support is to extend a shaft or shafts through the housing to carry the generated loads, freeing the housing shell from this function. When axial forces are generated in the power booster, the shaft(s) hold the relative positions of the front and rear housing walls.

One significant problem that arises, when extending a shaft through the erstwhile hermetic chambers of a power booster, resides in a need to provide a secure seal assembly where the shaft passes through the structure.

SUMMARY OF THE INVENTION

The present invention is a power booster comprising a housing, a tube, and a seal. The housing includes a front housing section, a rear housing section, and a divider. The tube is mechanically fastened proximate the rear housing section and generally stationary relative to the rear housing section, with the seal between the divider and the tube.

The features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENTS

Figure 1:
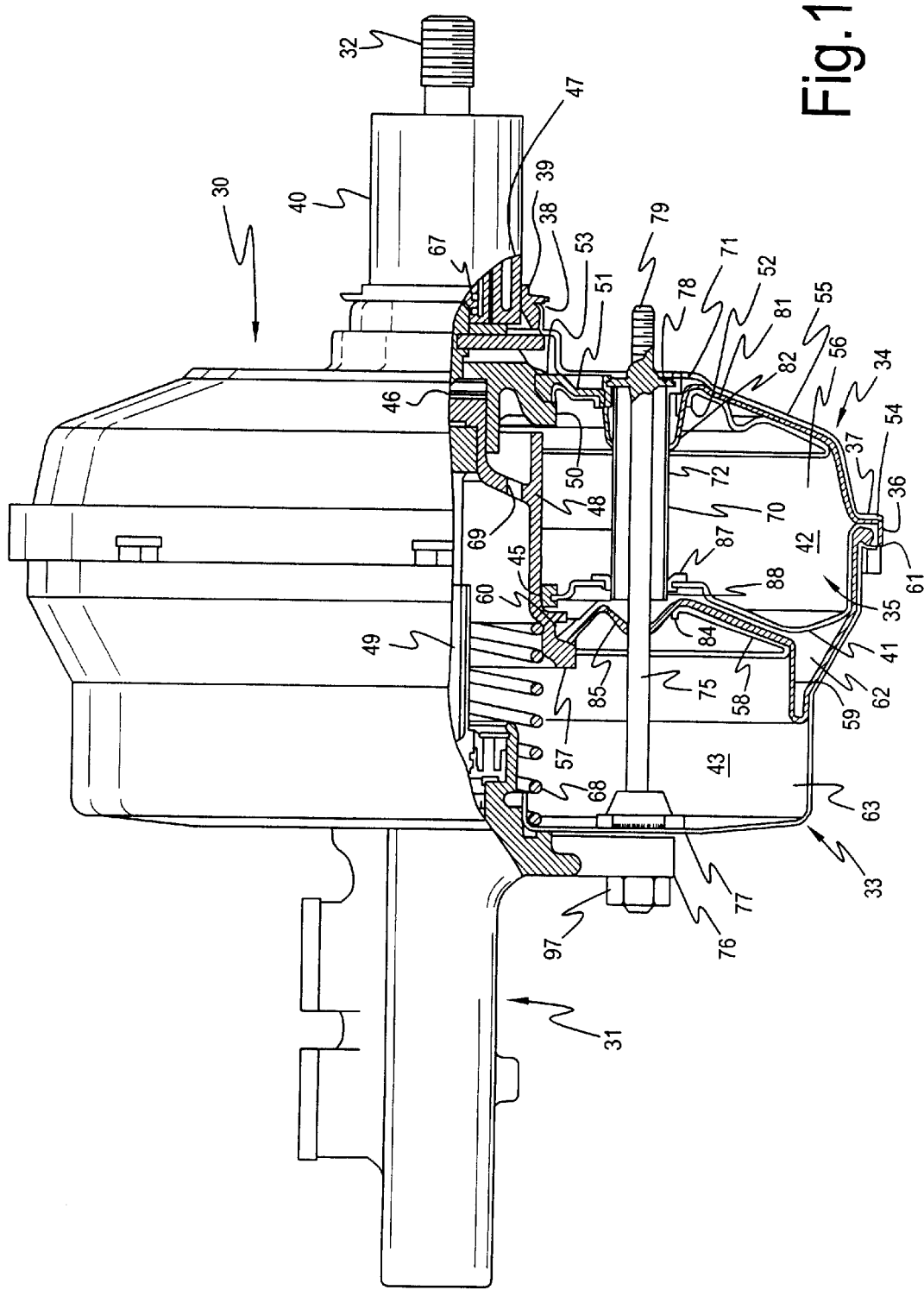
FIG. 1 is a fragmentary cross sectional illustration of a power booster according to the present invention.

FIG. 1 shows a power booster 30 according to the present invention. The power booster 30 supports a master cylinder 31, which is commonly known in the art, and includes a push rod 32 that actuates the power booster 30 through a brake pedal (not illustrated). Power booster 30 is a tandem power booster in this exemplary embodiment. Power booster 30 has a substantially open internal cavity 35 which is formed by mating front housing section 33 and rear housing section 34. The front and rear housing sections 33 and 34 are formed from a conventional lightweight material such as metal or plastic. Rear housing section 34 includes an axially extending flange 36. Axially extending flange 36 mates with outer turned flange 37 of front housing section 33 locking the housing sections 33, 34 together. An inner edge 38 of rear housing section 34 carries a seal 39. The end of rear housing section 34 is enclosed by boot 40 which is received by the seal 39.

A housing divider wall 41 separates the internal cavity 35 into primary and secondary chambers 42 and 43, respectively. Housing divider wall 41 includes an outer peripheral flange which is engaged between the front housing section 33 and rear housing section 34. Housing divider wall 41 also includes an inner edge that carries an annular seal 45. A secondary piston 48 extends through annular seal 45. The secondary piston 48 is slidable forwardly and rearwardly to actuate the master cylinder 31 through the output rod 49. The annular seal 45 acts as a bearing for supporting the secondary piston 48 in the lateral direction.

Secondary piston 48 is mechanically linked to a primary piston 47 through a rubber reaction disk 46. This primary piston 47 includes an annular wall 50, against which primary support wall 51 supports primary diaphragm 52. Primary diaphragm 52 includes an integral inner annular seal 53 which engages the primary piston 47 and an integral outer annular seal 54 that engages housing divider wall 41 and the rear housing section 34. Primary diaphragm 52 separates primary chamber 42 into variable pressure compartment 55 and vacuum compartment 56. Secondary piston 48 includes annular wall 57 against which secondary support wall 58 supports secondary diaphragm 59. Secondary diaphragm 59 includes an integral inner annular seal 60 which engages the secondary piston 48 and an integral outer annular seal 61 that engages the housing divider wall 41 and the front housing section 33. Secondary diaphragm 59 separates secondary chamber 43 into variable pressure compartment 62 and vacuum compartment 63.

The diaphragms 52 and 59, and their respective support walls 51 and 58, are operable such that a vacuum pressure exists in vacuum compartments 56 and 63 which is generated therein by engine intake vacuum or by a supplementary source. A variable pressure exists in variable pressure compartments 55 and 62 for selectively moving primary piston 47 and secondary piston 48 forward in response to pressure differentials created by the introduction of atmospheric air through air valve 67. The variable pressure in variable pressure compartments 55 and 62 selectively creates a force on the respective diaphragms 52 and 59. The support walls 51 and 58 apply the force of the diaphragms 52, 59 to the respective annular walls 50 and 57 of piston 47 and piston 48. In response, piston 48 compresses return spring 68, causing piston 48 to slide within annular seal 45 and power piston 47 to slide within seal 39, forcing output rod 49 to apply force to the master cylinder 31.

The variable pressure in variable pressure compartments 55 and 62 is increased through operation of the air valve 67. Air valve 67 selectively allows atmospheric pressure to enter the compartments 55 and 62 under operation of the pushrod 32 and thus creates a pressure differential across the diaphragms 52 and 59. The maximum pressure differential between the variable pressure compartments 55 and 62 on one hand, and vacuum compartments 56 and 63 on the other hand, is generally the difference between the vacuum source and atmospheric pressure.

Atmospheric air entering the power booster 30 travels through the air valve 67 and the vacuum drawn from the power booster 30 exits through a vacuum check valve (not illustrated), which is received in the front housing section 33 in communication with vacuum chamber 63. Piston 48 includes an air passage 69 through which the vacuum effect is transferred from vacuum chamber 63 to vacuum chamber 56. A tube 70 is provided that extends from beyond the housing divider wall 41 to at or near the rear wall 71 of rear housing section 34. The tube 70 is mechanically fastened proximate the rear housing section 34 and generally stationary relative to the rear housing section. In the embodiment shown in FIG. 1, one end of the tube 70 is crimped around a flange 78 of a shaft or tie rod 75. The tube 70 provides an opening 72 that extends through housing divider wall 41, diaphragm 52 and support wall 51. A series of side openings 73 are provided in tube 70 that register with the variable pressure compartment 55 so that the tube 70 provides the air flow path for atmospheric air entering the variable pressure compartment 55 from the variable pressure compartment 62.

Shaft 75 extends through the power booster 30 and a flange 76 of master cylinder 31. The shaft 75 is fixed to the master cylinder 31 capturing the front wall 77 of front housing section 33 against the flange 76, and is held in place by a nut 97. The rear wall 71 is positioned by the flange 78 fixed in position on the shaft 75 and a segment 79 is provided for attachment to a vehicle's mounting structure (not illustrated). The shaft 75 extends through secondary diaphragm 59 and its secondary support wall 58, housing divider 41, and primary diaphragm 52 and its primary support wall 51. The support wall 51 includes an opening with a forward turned lip 81, through which the shaft 75 extends. The primary diaphragm 52 includes an integral flexible sleeve 82 that extends through the opening and engages tube 70, sealing thereagainst. Similarly, the secondary support wall 58 includes an opening with a forward turned lip 84, through which the shaft 75 extends. The secondary diaphragm 59 includes an integral flexible sleeve 85 that extends through the opening and engages shaft 75, sealing thereagainst. During operation of the power booster 30, the sleeve 82 slides along the tube 70 as the primary diaphragm 52 and its primary support wall 51 move. Additionally, the sleeve 85 slides along the shaft 75 as the secondary diaphragm 59 and its secondary support wall 58 move. The housing divider wall 41 includes an opening that carries a dynamic seal 87.

Figure 2:
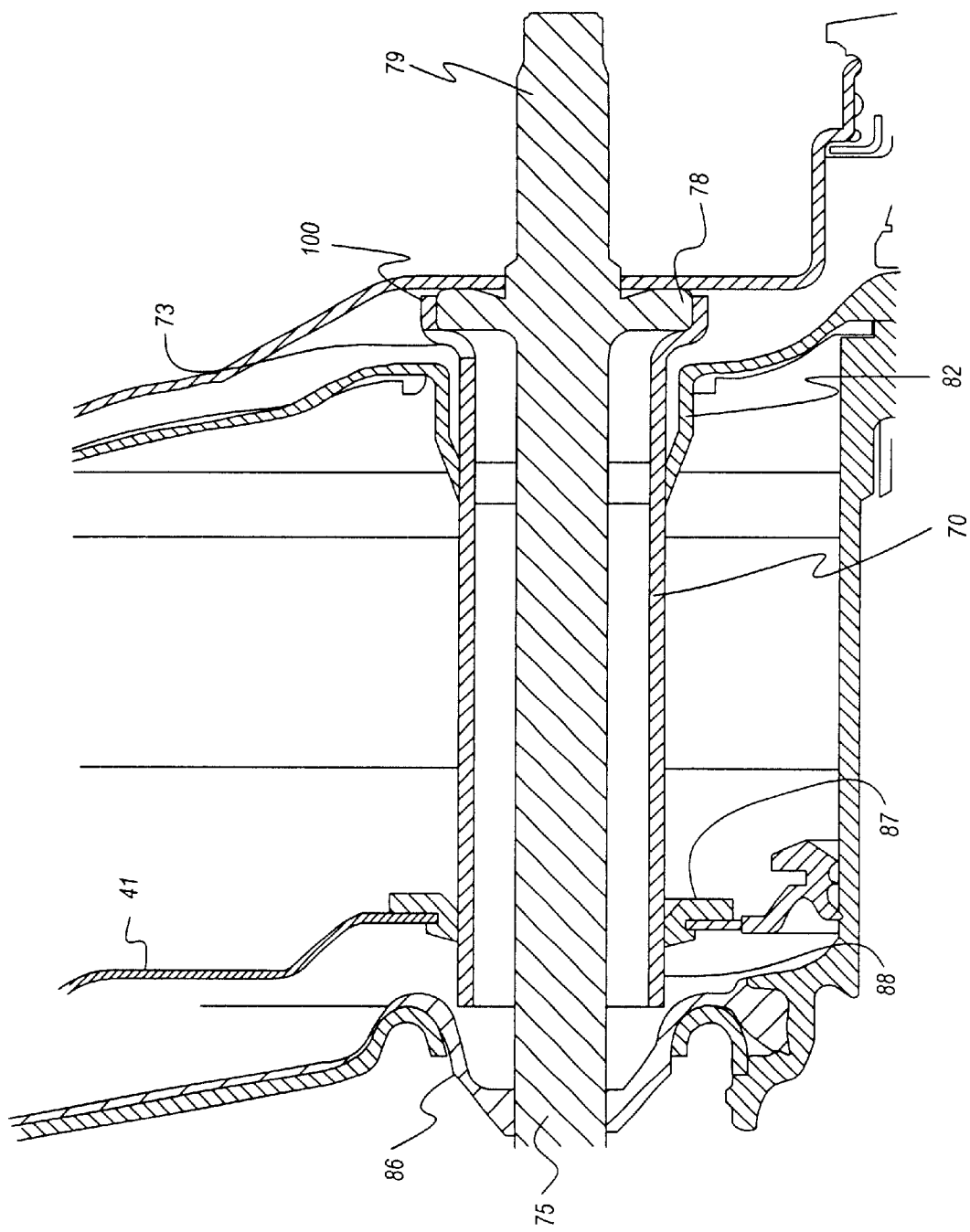
FIG. 2 is a cross-sectional view of a portion of the power booster showing an alternative embodiment of the invention.
Figure 3:
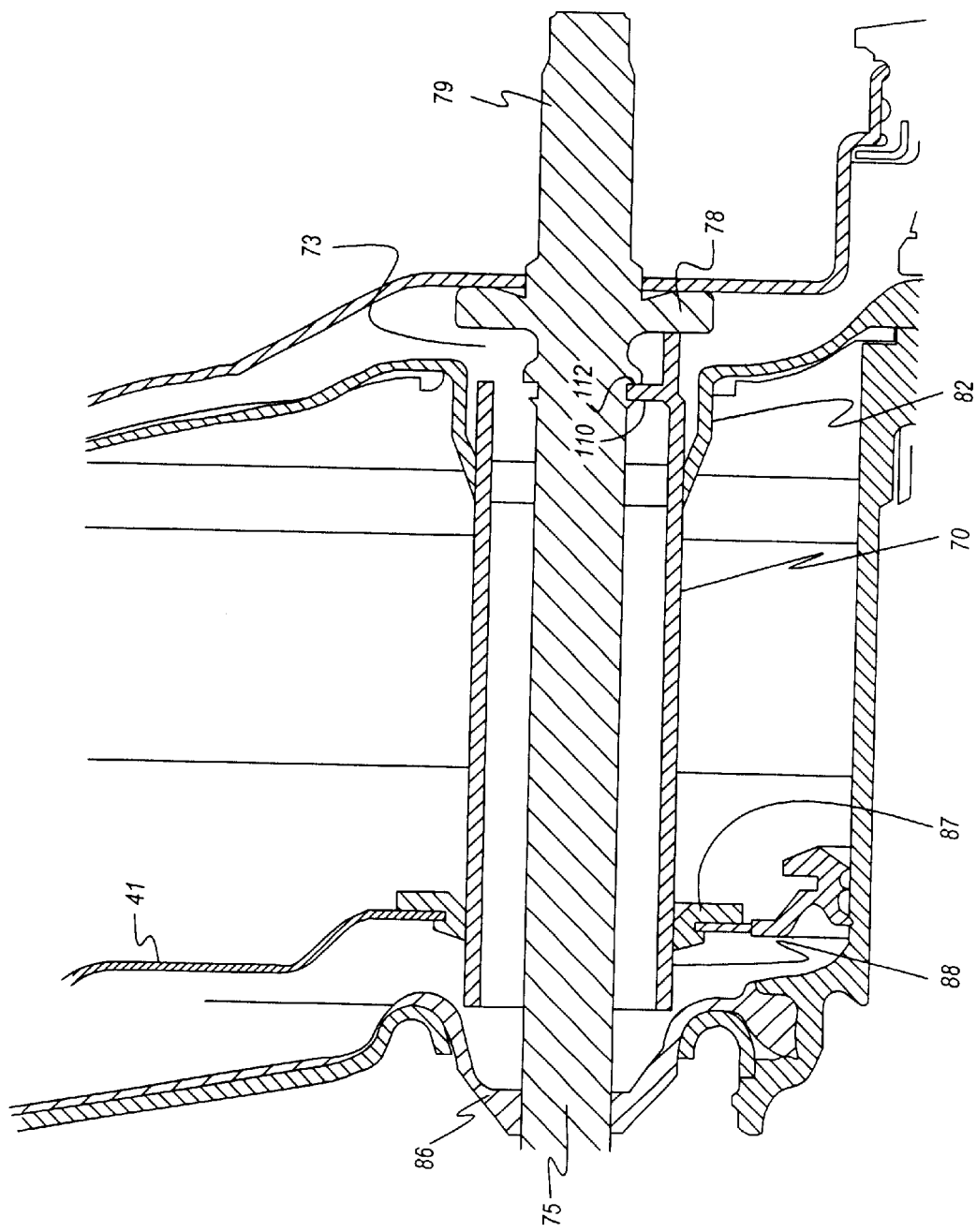
FIG. 3 is a cross-sectional view similar to FIG. 2 and showing another alternative embodiment of the invention.

FIGS. 2 and 3 show alternative embodiments of the present invention. In FIG. 2, the tube 70 is provided with a flared end 100 having an inside diameter closely matched to the outside diameter of the flange 78 of the tie rod 75. With this arrangement, the flared end of the tube 70 establishes an interference fit with the tie rod. Such an interference fit is a relatively easy and inexpensive assembly operation. In FIG. 3, the tube 70 is provided with one or more inwardly projecting ribs 110. The ribs 110 engage an annular groove 112 formed in the tie rod 75 to position the tube 70 within the power booster.

Figure 4:
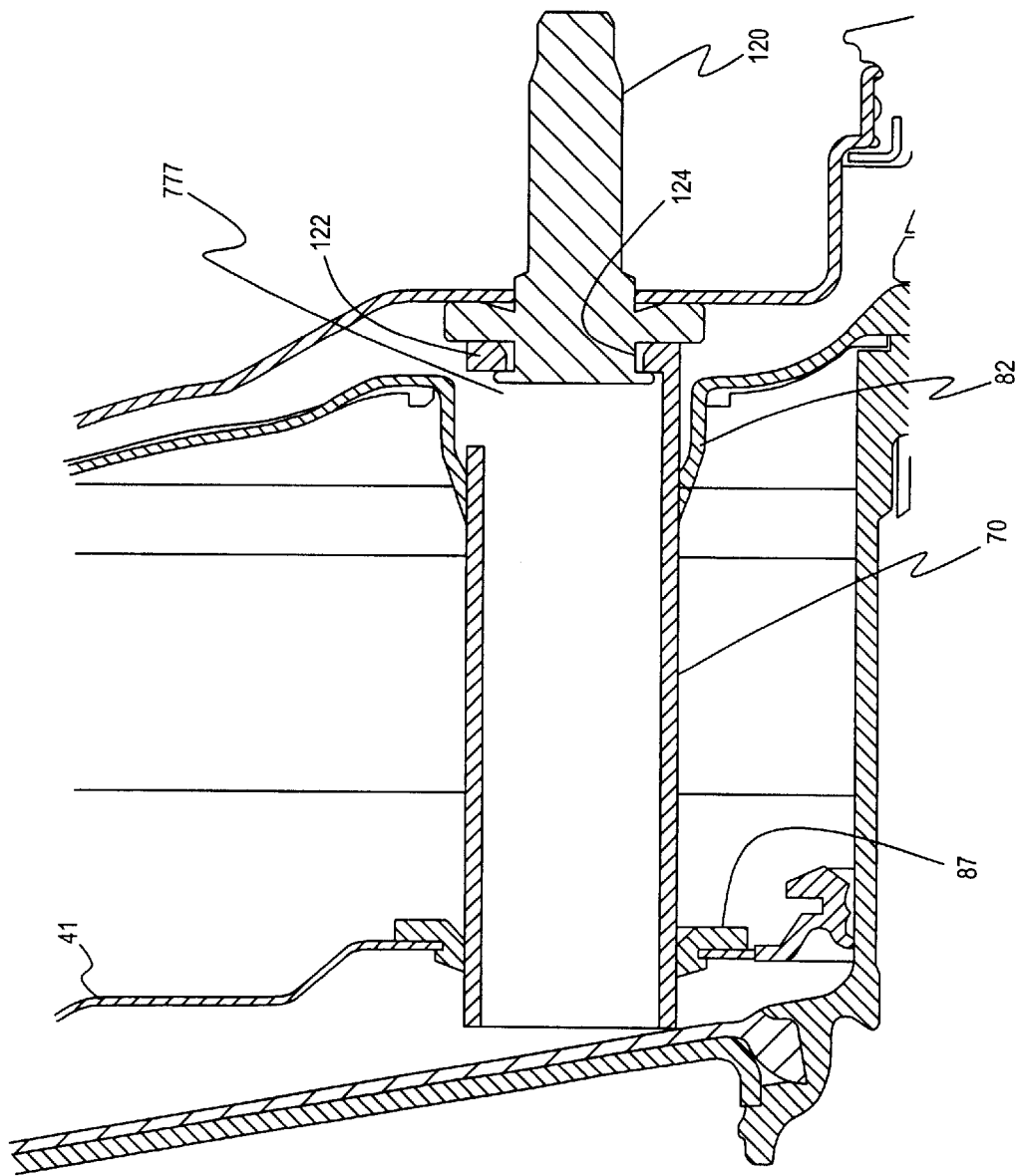
FIG. 4 is a cross sectional view similar to FIGS. 2 and 3 and showing yet another alternative embodiment of the present invention.

FIG. 4 shows still another alternative embodiment of the present invention in which the power booster includes a stud 120. In this embodiment, the tube 70 is provided with an integral, inwardly projecting flange 122. The flange 122 is snap fit or otherwise attached to an annular groove 124 formed on the stud 120.

During operation of the power booster 30, the housing divider wall is subjected to a pressure differential between its side in variable pressure compartment 62 and its side in vacuum compartment 56. At maximum, the pressure differential is equal to the difference between the vacuum source and the atmospheric pressure. In application, this pressure differential may deflect the housing divider wall 41 an appreciable amount. The dynamic seal 87, however, allows the divider 41 to move along the tube 70.

It should be appreciated that in any of the embodiments shown, the mechanical attachment between the tube and the housing can be formed by an interference fit, crimping, welding, or any other appropriate method. It should also be appreciated that the present invention is applicable in ordinary boosters, as well as in lightweight boosters. The above-described implementations of this invention are example implementation. For instance, the present invention can be used in multiple (triple or more) boosters, on pressure boosters as well as vacuum boosters, with different types of reaction principles, or with a one- or two-piece pistons. Moreover, various other improvements and modifications to this invention may occur to those skilled in the art and those improvements and modifications will fall within the scope of this invention as set forth below.

The embodiments of this invention in which an exclusive property or privilege is claimed are defined as follows:

1. A power booster comprising:
   a housing including a front housing section, a rear housing section, and a divider;
   a tube mechanically fastened proximate the rear housing section and generally stationary relative to the rear housing section; and
   a seal between the divider and the tube and movable along the tube.

2. The power booster of claim 1 further comprising a component extending within the tube.

3. The power booster of claim 2 wherein the component comprises a tie rod.

4. The power booster of claim 3 wherein the tie rod extends between the front housing section and the rear housing section.

5. The power booster of claim 2 wherein the tube is mechanically fastened to the tie rod.

6. The power booster of claim 2 wherein the tie rod includes a flange, and the tube is mechanically fastened to the flange.

7. The power booster of claim 2 wherein the tie rod includes an annular groove, and the tube engages the annular groove.

8. The power booster of claim 1 further comprising a stud positioned proximate the rear housing section.

9. The power booster of claim 8 wherein the tube is mechanically fastened to the stud.

10. The power booster of claim 1 wherein the tube is mechanically fastened to the rear housing section.

11. The power booster of claim 1 wherein the tube is welded to the rear housing section.

12. The power booster of claim 1 wherein the seal comprises an elastomeric seal.

13. A power booster comprising:
- a housing including a front housing section, a rear housing section, and a divider;
- a tie rod extending from the rear housing section;
- a tube mechanically fastened to the tie rod and generally stationary relative to the rear housing section; and
- a seal between the divider and the tube and movable along the tube.

14. The power booster of claim 13 wherein the tie rod extends from the rear housing section to the front housing section.

15. The power booster of claim 13 wherein the tie rod includes a flange, and the tube is mechanically fastened to the flange.

16. The power booster of claim 13 wherein the tie rod includes an annular groove, and the tube engages the annular groove.

17. The power booster of claim 13 wherein the tube is welded to the tie rod.

18. The power booster of claim 13 wherein the seal comprises an elastomeric seal.

19. A power booster booster comprising:
- a housing including a front housing section, a rear housing section, and a divider;
- a tie rod extending from the front housing section to the rear housing section, the tie rod including a flange;
- a tube mechanically fastened to the flange and generally stationary relative to the rear housing section; and
- a seal between the divider and the tube.

20. The power booster of claim 19 wherein the seal comprises an elastomeric seal.

* * * * *